(12) United States Patent
Arora et al.

(10) Patent No.: US 8,804,139 B1
(45) Date of Patent: Aug. 12, 2014

(54) METHOD AND SYSTEM FOR REPURPOSING A PRESENTATION DOCUMENT TO SAVE PAPER AND INK

(75) Inventors: Kapil Arora, New Delhi (IN); Naveen Goel, Uttar Pradesh (IN); Mayur Hemani, New Delhi (IN); Neha Rastogi, Uttar Pradesh (IN); Hemant Virmani, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 269 days.

(21) Appl. No.: 12/849,271

(22) Filed: Aug. 3, 2010

(51) Int. Cl.
*G06F 3/12* (2006.01)

(52) U.S. Cl.
USPC ......... 358/1.1; 358/1.13; 358/1.15; 358/1.16; 358/1.18; 358/1.12; 358/1.9; 382/305; 382/284; 382/282; 382/290; 382/294; 382/224

(58) Field of Classification Search
USPC ............ 358/1.13, 1.15, 1.16, 1.18, 1.1, 1.12, 358/1.9; 382/305, 284, 282, 290, 294, 224
See application file for complete search history.

(56) References Cited

U.S. PATENT DOCUMENTS

| | | | | |
|---|---|---|---|---|
| 5,666,208 A | * | 9/1997 | Farrell et al. | 358/296 |
| 6,072,501 A | * | 6/2000 | Bier | 345/629 |
| 6,147,742 A | * | 11/2000 | Bell et al. | 355/27 |
| 7,366,974 B2 | * | 4/2008 | Kalajian et al. | 715/248 |
| 2002/0171872 A1 | * | 11/2002 | Matsunaga | 358/1.18 |
| 2006/0059414 A1 | * | 3/2006 | Cory et al. | 715/500 |
| 2007/0019004 A1 | * | 1/2007 | Ghislain Bossut et al. | 345/648 |
| 2007/0038937 A1 | * | 2/2007 | Asakawa et al. | 715/730 |
| 2007/0058178 A1 | * | 3/2007 | Kurihara et al. | 358/1.2 |
| 2007/0273895 A1 | * | 11/2007 | Cudd et al. | 358/1.1 |
| 2011/0032562 A1 | * | 2/2011 | McCuen et al. | 358/1.15 |
| 2011/0043831 A1 | * | 2/2011 | Sprague et al. | 358/1.2 |

\* cited by examiner

*Primary Examiner* — Benny Q Tieu
*Assistant Examiner* — Quyen V Ngo
(74) *Attorney, Agent, or Firm* — Moser Taboada

(57) ABSTRACT

A presentation document is repurposed to save paper and ink. An indication that a printout of a presentation document from a printer has been requested is received. The presentation document has content with a format that would result in a first quantity of pages being printed. The content has a plurality of slides and a plurality of shapes. Further, the presentation document is preprocessed to acquire data associated the presentation document. Group shaping is also performed to group the plurality of shapes into one or more groups based on shapes that have to be transformed together. Further, content transformation is performed to generate transformed content. In addition, a content re-layout is performed to determine placement of the transformed content.

18 Claims, 9 Drawing Sheets

ENLARGED DIAGRAM THAT IS NOT DRAWN TO SCALE

ENLARGED DIAGRAM THAT IS NOT DRAWN TO SCALE

ENLARGED DIAGRAM THAT IS NOT DRAWN TO SCALE

METHOD AND SYSTEM FOR REPURPOSING A PRESENTATION DOCUMENT TO SAVE PAPER AND INK

BACKGROUND

1. Field

This disclosure generally relates to printing. More particularly, the disclosure relates to the reduction of paper and/or ink utilized for printing.

2. General Background

Recent attempts have been made to make technology more environmentally friendly. The resulting technologies are typically called green technologies. For example, green technologies have been developed for computers, automobiles, household appliances, etc.

With respect to computing technologies, a significant environmental concern stems from the printing of paper. Computer users may use compute printers to print large quantities of various types of documents, which typically leads to the use of large amounts of paper. A large demand for paper may lead to the destruction of large quantities of trees, which may have a negative impact on the environment.

As a result, computer users are typically encouraged to reduce the amount of paper utilized for printing by scaling multiple pages down to fit on a single page. A problem with this approach is that the readability and aesthetics of the page are severely hampered. A user may have such a difficult time reading text that has been miniaturized so that two or more pages may fit on one side of a sheet of paper (the other side may also have two or more pages) that the user may simply choose not to utilize green printing and may print in the typical manner, which would not be environmentally friendly.

SUMMARY

In one aspect of the disclosure, a computer program product is provided. The computer program product includes a computer useable medium having a computer readable program. The computer readable program when executed on a computer causes the computer to receive an indication that a printout of a presentation document from a printer has been requested. The presentation document has content with a format that would result in a first quantity of pages being printed. The content has a plurality of slides and a plurality of shapes. Further, the computer readable program when executed on the computer causes the computer to preprocess the presentation document to acquire data associated with the presentation document. The computer readable program when executed on the computer also causes the computer to perform group shaping to group the plurality of shapes into one or more groups based on shapes that have to be transformed together. Further, the computer readable program when executed on the computer causes the computer to perform content transformation to generate transformed content. In addition, the computer readable program when executed on the computer causes the computer to perform a content re-layout to determine placement of the transformed content. The computer readable program when executed on the computer causes the computer to generate a green presentation document according to the content re-layout such that the green presentation document has a second quantity of pages that is less than the first quantity of pages.

In another aspect of the disclosure, a process is provided. The process receives an indication that a printout of a presentation document from a printer has been requested. The presentation document has content with a format that would result in a first quantity of pages being printed. The content has a plurality of slides and a plurality of shapes. Further, the process preprocesses the presentation document to acquire data associated the presentation document. The process also performs group shaping to group the plurality of shapes into one or more groups based on shapes that have to be transformed together. Further, the process performs content transformation to generate transformed content. In addition, the process performs a content re-layout to determine placement of the transformed content. The process also generates a green presentation document according to the content re-layout such that the green presentation document has a second quantity of pages that is less than the first quantity of pages.

In yet another aspect of the disclosure, a system is provided. The system includes a green print module that receives an indication that a printout of a presentation document from a printer has been requested. The presentation document has content with a format that would result in a first quantity of pages being printed, the content having a plurality of slides and a plurality of shapes. The system also includes a processor that (i) preprocesses the presentation document to acquire data associated the presentation document, (ii) performs group shaping to group the plurality of shapes into one or more groups based on shapes that have to be transformed together, (iii) performs content transformation to generate transformed content, (iv) performs a content re-layout to determine placement of the transformed content, and (v) generates a green presentation document according to the content re-layout such that the green presentation document has a second quantity of pages that is less than the first quantity of pages.

DRAWINGS

The above-mentioned features of the present disclosure will become more apparent with reference to the following description taken in conjunction with the accompanying drawings wherein like reference numerals denote like elements and in which.

DETAILED DESCRIPTION

Figure 1:
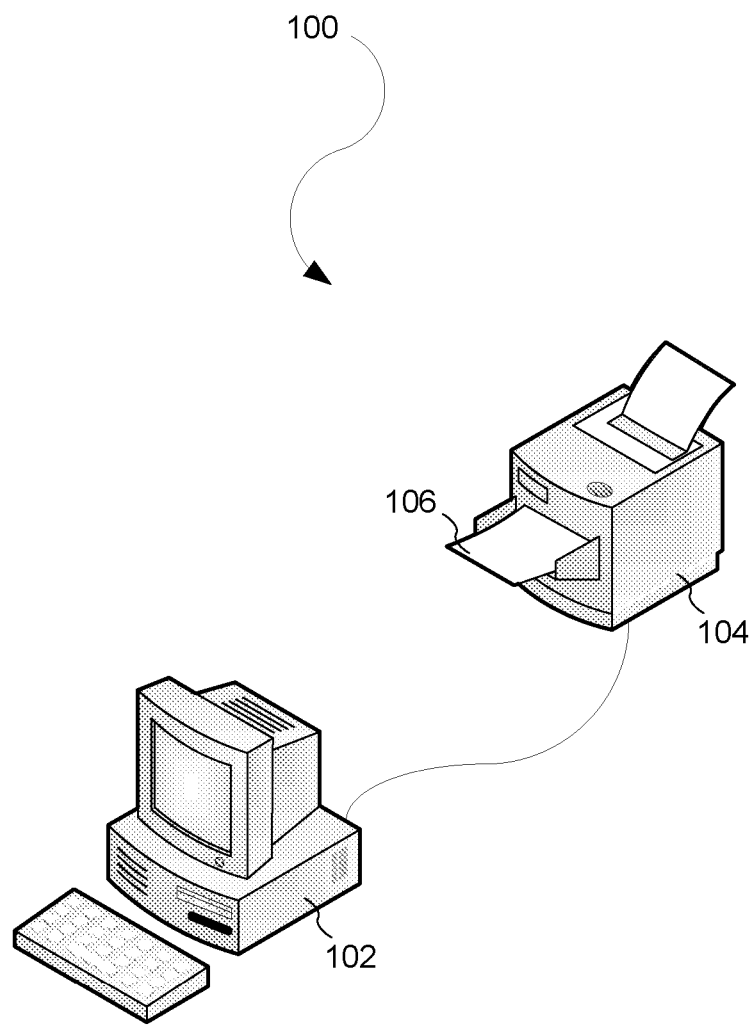
FIG. 1 illustrates a green printing configuration.

A green printing configuration is provided herein that repurposes a presentation document to save paper and/or ink. The green printing configuration is a configuration that reduces the number of pages and/or ink utilized to print a presentation document through content repurposing, which is an approach that transforms content and the formatting of the content to shrink the size of the content to fit into fewer pages at the same time as retaining the readability and aesthetics of the presentation document. The green printing configuration may be a method, system, computing device, computer program stored on a computing device, computer program stored on a printer, computer module that may be downloaded through a network, plug-in, extension, etc. In one embodiment, a user may print in a single click to a default printer so that the content takes up fewer pages and/or less ink than a typical printed document.

A presentation document may have content elements such as text, etc. Further, a presentation document may have non-content elements such as layout constraints, text formatting, fonts, and spacing elements. Examples of layout constraints include page dimension, margins, gutters, and orientation. Each element contributes to the overall appearance of a document. With respect to printing, the content in a presentation document cannot be significantly changed as the user will likely want to print the content in the presentation document. Accordingly, the green printing configuration maintains the content as a constant during the green printing of a presentation document.

The non-content elements primarily contribute to the visual appearance of the presentation document. For example, the non-content elements may function as separators for blocks of content, signifiers of importance, signifiers of relevance, and/or markers of relatedness. These non-content elements are the presentation document formatting of the document. The presentation document formatting contributes to certain redundancies in the presentation document by making the presentation document occupy more space. The green printing of a presentation document utilizes these redundancies in a manner that provides a quantifiable trade off between the number of pages and/or the amount of ink utilized by the content and the overall appearance of the presentation document.

A presentation document may have three types of redundancies. First, the presentation document may have a redundancy that affects the number of pages occupied by the content. Second the presentation document may have a redundancy that affects the amount of ink utilized to print the presentation document. Finally, the presentation document may have a redundancy that affects both the paper and the ink.

Presentation documents have redundancies that are specific to a presentation document and are different than other types of documents such as word processing documents, spreadsheets, etc. A presentation document may be considered a grid document, which is a paginated document with content placed on evenly spaced grid lines.

Content repurposing may minimize or eliminate redundant white space in a presentation document. Further, content repurposing may reduce the size of large text in a presentation document. In other words, content repurposing automatically adjusts the format of the content according to the adjustments that a user would most likely want to see in order to reduce the number of pages in the document so that the user can still comfortably read the document.

The transformations utilized for content repurposing have the goal of reducing the overall redundancy in a document. Although a group of transformations together may reduce the redundancy, one or more of the transformations may individually increase the redundancy. The redundancy for an individual transformation may be increased to accentuate certain characteristics of the document to add to the aesthetic appeal and/or readability of the document. For example, if and when a presentation document is printed with multiple pages per paper sheet, a green print program may automatically decide to increase the size of the text to make the text more readable.

A transformation may have a magnitude associated therewith. In one embodiment, the magnitude may be binary. The binary magnitude may indicate whether a transformation is applied is or not applied, e.g., "0" equals transformation is not to be applied and "1" equals transformation is to be applied. In another embodiment, the magnitude may have a set of predefined discrete values. In another embodiment, the magnitude may take continuous values.

Each instance of a transformation type may have a transformation cost associated therewith for a particular document type. In other words, a particular sizing transformation may have a different transformation cost for a presentation document than for a spreadsheet.

Further, each transformation may have an associated paper saving potential. For example, a particular textual transformation may save one tenth of a sheet of paper. In addition, each transformation may have an associated saved ink quantity. For example, a particular textual transformation may save one half an ounce of ink. The transformation may potentially have both a saved paper quantity and a saved ink quantity if both paper and ink would be saved as a result of the transformation.

FIG. 1 illustrates a green printing configuration 100. As an example, a computing device 102 is illustrated as a PC. Further, as an example, the computing device 102 is operably connected to a printer 104 through a wireline connection. The term computing device 102 is herein intended to include a personal computer ("PC"), desktop computer, laptop, notebook, cell phone, smart phone, personal digital assistant ("PDA"), kiosk, etc. Further, the computing device 102 may be a client, server, network device, etc. The printer 104 may be a printing device that is separately connected, e.g., through a wireline or wireless connection, to the computing device 102, built into the computing device 102, etc. A wireless connection may receive and/or send data through a Radio Frequency ("RF") transmission, an Infrared ("IR") transmission, or the like. The printer may or may not be part of a network. Further, the printer 104 may utilize any type of printing methodology to print on paper 106, e.g. laser printing, ink jet printing, or the like.

In one embodiment, a grid document utilizes shapes as the primary building blocks. Shapes may include text, graphics, images, or the like. These shapes are placed on pages called slides according to horizontal and vertical grid lines defined for each slide. In the context of printing, the largest redundancy in a presentation results from the content from one slide not being able to flow into the content from another slide. Therefore, large vacant spaces present in the slides remain unutilized on paper. Other forms of redundant white space in slides include margins, gaps between shapes, and gaps inside the boundaries of shapes, e.g., between text lines in text boxes. Further, a large percentage of presentation document slides also utilize backgrounds, large text, and unnecessary shape fills.

Based on the document formatting attributes for a grid document, the green print configuration 100 may be utilized to perform transformations in a grid document. These transformations include, but are not limited to the following: changing the slide orientation, shrinking text sizes, shrinking shape groups and images, flowing content from one slide into another, i.e., disregarding slide boundaries, removing shape fills, and/or lightening colors. Some transformations may only be utilized in conjunction with a re-layout of the content because the transformations necessitate a different layout than the standard slide and grid based layout.

Figure 2:
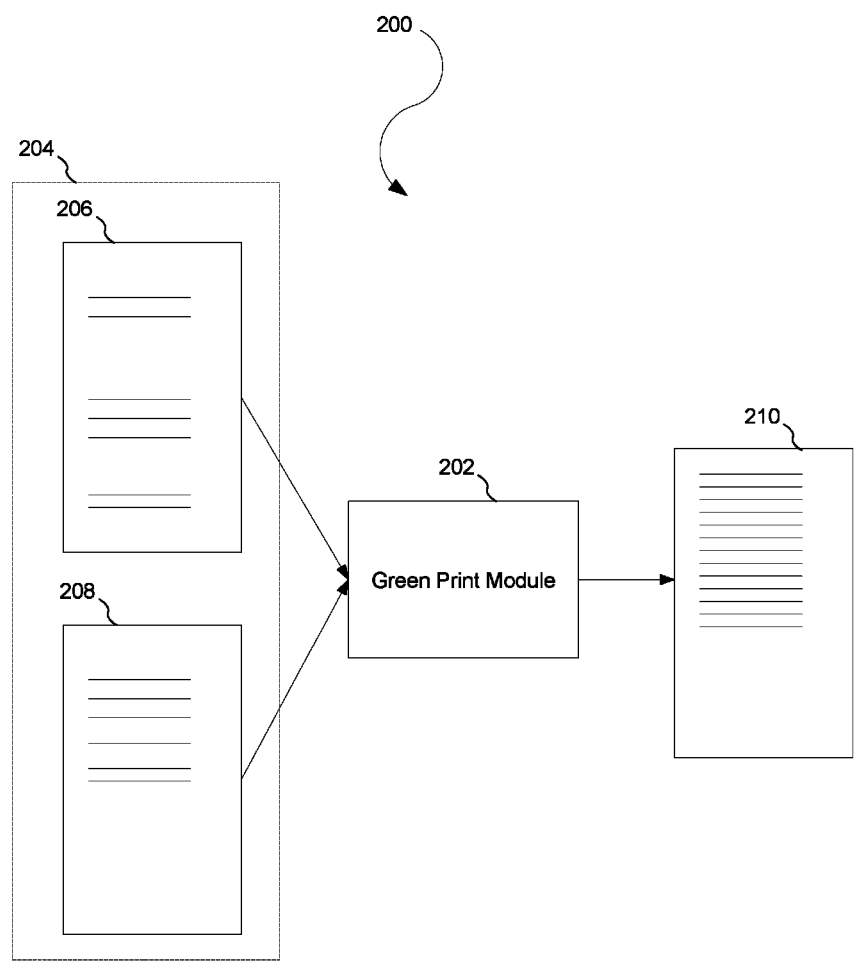
FIG. 2 illustrates a green print module that may be utilized with the green printing configuration.

FIG. 2 illustrates a green print module 202 that may be utilized with the green printing configuration 100. The green print module may be stored in the computing device 102 or the printer 104. The green print module 202 may analyze the content of multiple slides of a presentation document to repurpose the content to save paper and/or ink. For example, the green print module 202 may analyze a first slide 206 and a second slide 208 of a presentation document 204. The green print module 202 may then repurpose the content of the presentation document 204 so that a green presentation document 210 may be printed. The green presentation document 210 has a repurposed page 210 that has the content from the first page 206 and the second page 208 in a readable format. Lines are provided in a document as illustrated in drawings such as FIG. 2 to represent text, symbols, shapes, images, and/or the like.

Figure 3:
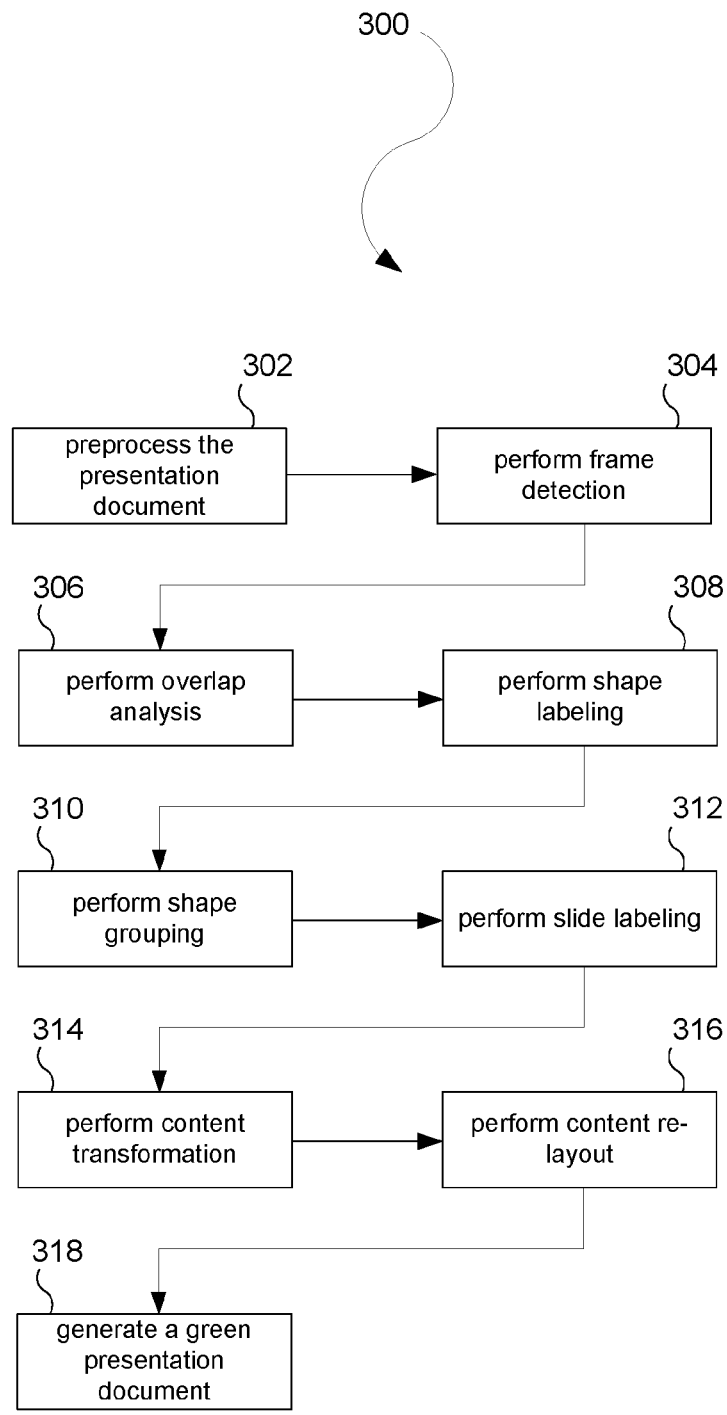
FIG. 3 illustrates a process that is utilized by the green print module illustrated in FIG. 2 to analyze a presentation document for the purpose of selecting one or more transformations to the presentation document for green printing.

FIG. 3 illustrates a process 300 that is utilized by the green print module 202 illustrated in FIG. 2 to analyze a presentation document for the purpose of selecting one or more transformations to the presentation document for green printing. At a process block 302, the process 300 preprocesses the presentation document. By preprocessing, the process 300 acquires information about the presentation including, but not limited to, shape dimensions, fills, text fonts, grouping information, and/or z-order, i.e., overlap, information. Further, at a process block 304, the process 300 performs frame detection. Many presentations have animations. The frame detection identifies a logical key-frame that can be printed rather than printing the entire slide. The frame detection is optional. In addition, at a process block 306, the process 300 performs an overlap analysis, which helps identify which shapes overlap with other shapes and in what z-order. This information is useful during the removal of fills as the appearance of the shapes as they are should be maintained. In one embodiment, the slides are converted to raster and replaced. In one embodiment, the process 300 may be performed without the overlap analysis in the process block 306. At a process block 308, the process 300 performs shape labeling. In one embodiment, a shape label may be a text box that is part of a diagram. A plurality of labeling rules may be utilized to identify and/or generate labels, which may be assigned one or more output characteristics. For example, a shape label may be assigned an output characteristic such as the size of text. Further, at a process block 310, the process 300 performs shape grouping. A diagram may be characterized as a group of shapes that may or may not be grouped. The shape grouping groups shapes and structures that have to move together in any transformation. A plurality of grouping rules may be utilized to perform the group shaping. In one embodiment, the shape labeling helps identify that the shapes and structures that have to be grouped together. In addition, at a process block 312, the process 300 performs slide labeling, which identifies logical constructs such as title slides, separation slides, agenda slides, or the like. Such slides are given relative importance during transformation of their content. Prior to finalizing the layout of the content, the process 300 advances to a process block 314 to perform slide content transformation, which removes shape fills and optimizes the size of each content block. For example, a text box may have lines of text with large fonts, large line spacing, large paragraph spacing, and/or blank lines. The shape fills and sizes are reduced according to the labels assigned to the shapes and the slides. At a process block 316, the process 300 performs a content re-layout to decide the final placement of the content in the output. For example, the scaling and placement decisions are made for the output. For instance, vertical gaps between groups, managing bounding boxes, or the like are handled. Further, the content re-layout may attempt a fit-to-page approach to fully utilize the pages that the content will occupy eventually. At a process block 318, the process 300 generates a green presentation document according to the content re-layout. The objects are placed on the output slides. All of the illustrated process blocks in FIG. 3 are not required for operation of the process 300. In other words, a sub-combination of the process blocks illustrated in FIG. 3 may be utilized to operate the process 300.

Figure 4A:
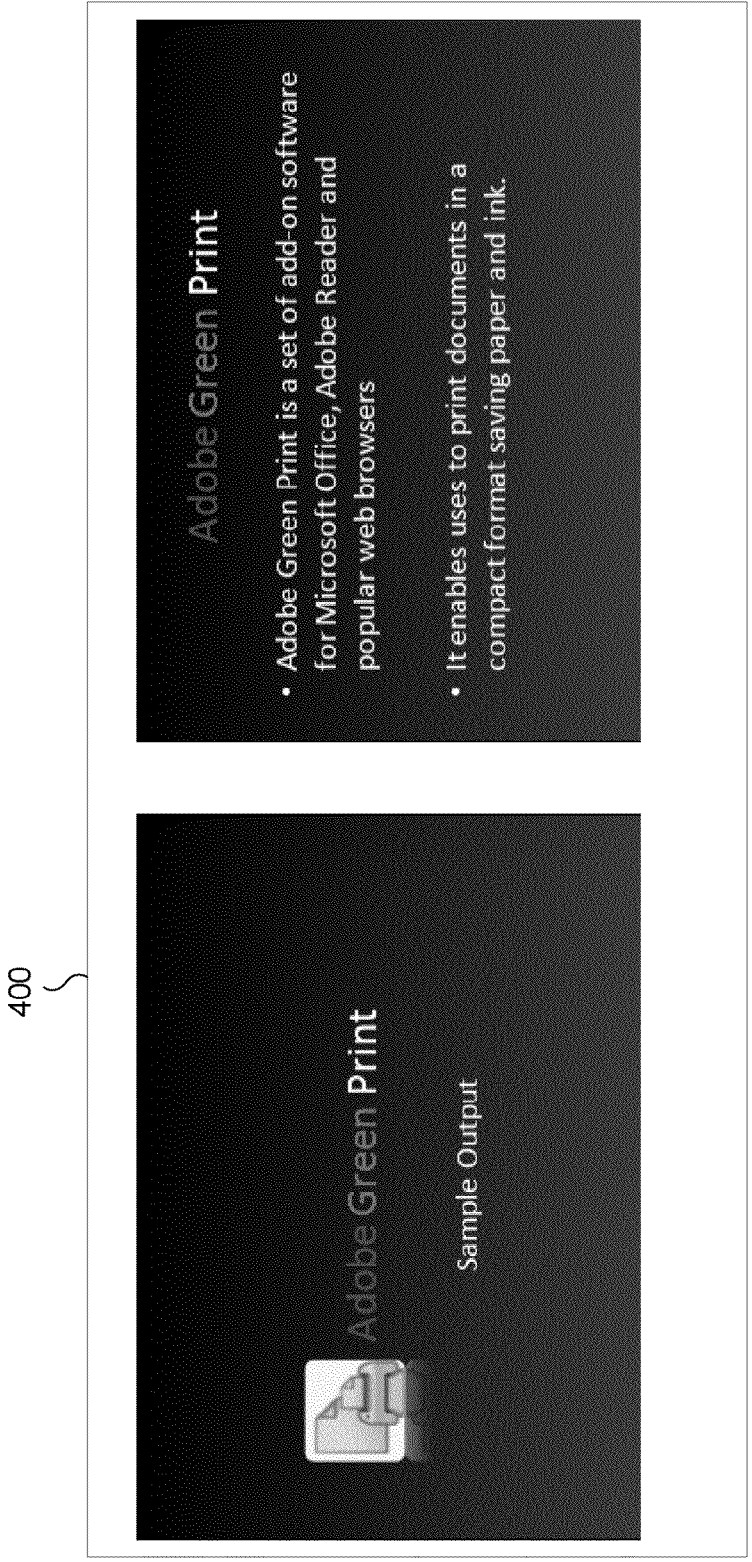
FIG. 4A illustrates an example of a first set of pages of a presentation document.
Figure 4B:
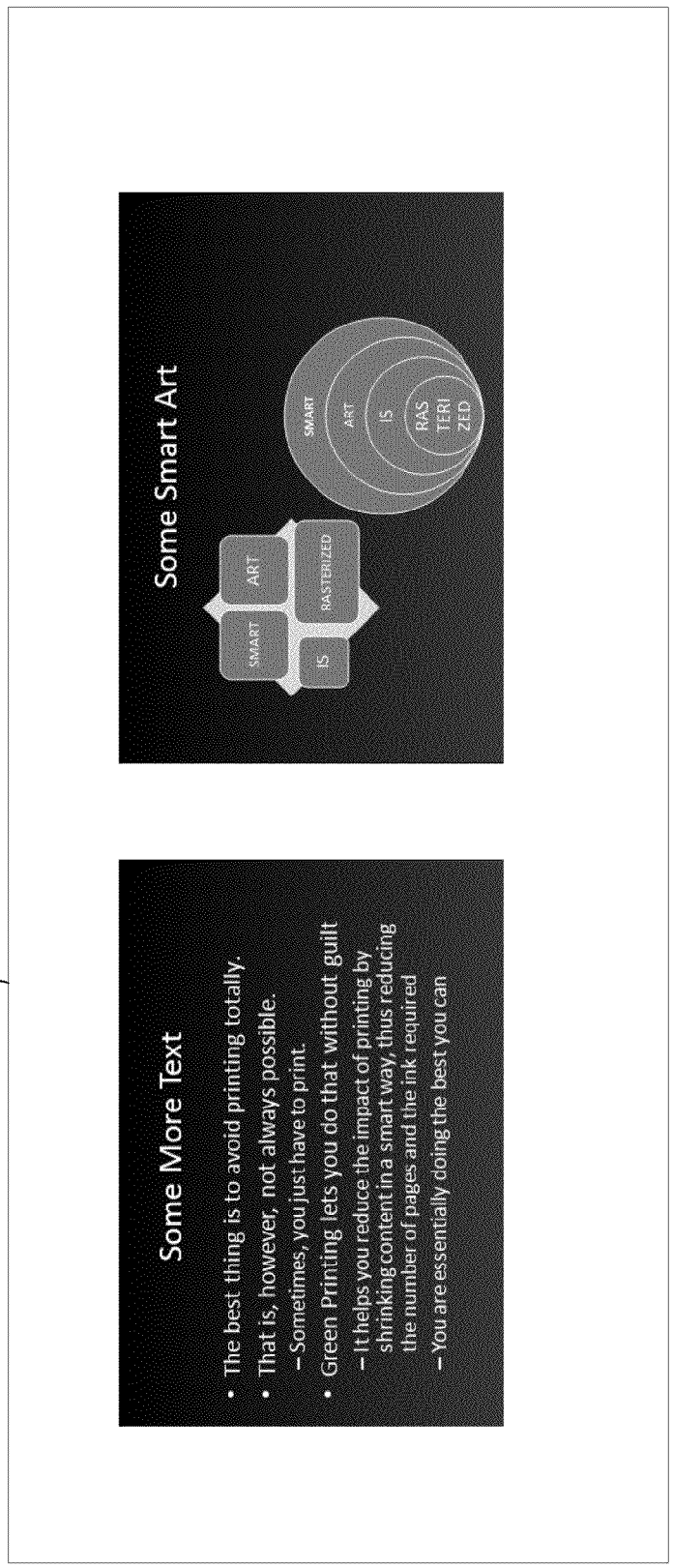
FIG. 4B illustrates an example of a second set of pages of a presentation document.
Figure 4C:
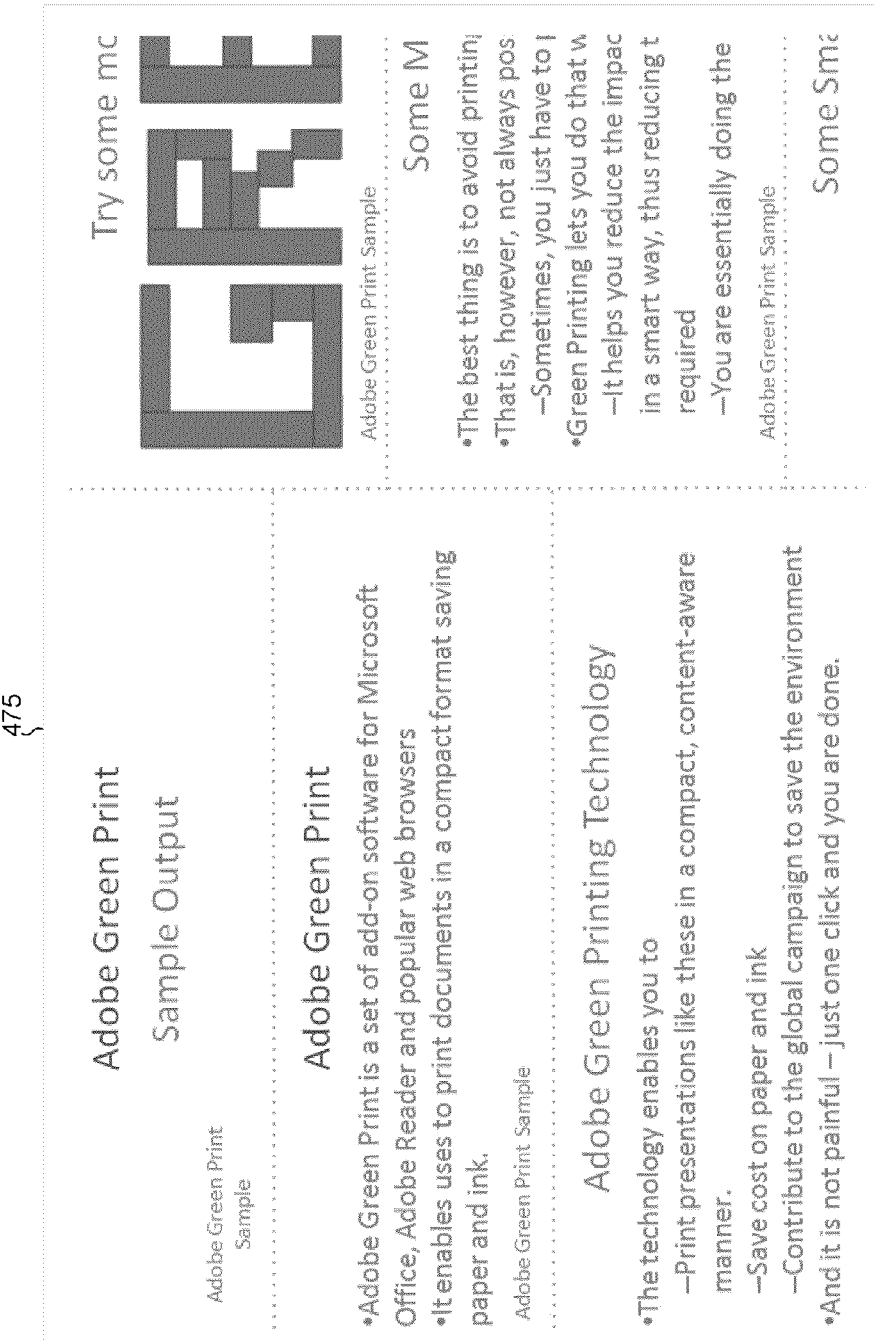
FIG. 4C illustrates an example of a green presentation document after green printing transformations have been applied to the first set of pages and the second set of pages of presentation document illustrated in FIGS. 4A and 4B.

FIG. 4A illustrates an example of a first set of pages 400 of a presentation document. The example in FIG. 4A is a six slide per page print output of the presentation document. Further, FIG. 4B illustrates an example of a second set of pages 450 of a presentation document. The example in FIG. 4B is a six slide per page print output of the presentation document. FIG. 4C illustrates an example of a green presentation document 475 after green printing transformations have been applied to the first set of pages 400 and the second set of pages 450 of presentation document illustrated in FIGS. 4A and 4B.

By automatically reducing the number of pages from the format that results in a first quantity of printed pages to a repurposed format that results in a second quantity of pages, the original appearance of the presentation document is lost. Accordingly, the trade-off between the appearance of the presentation document and the amount of savings achieved from green printing is quantified according to a repurposing quantifier. In one embodiment, the appearance of the presentation document is quantified in terms of aesthetic attributes and a measure of the influence of one or more transformations on the presentation document. In one embodiment, a readability threshold may be established to specify the degree to which the appearance of the presentation document may be degraded for the purpose of green printing. Further, the presentation document may be automatically repurposed without the distortion falling below the readability threshold. The readability threshold may be based one or more readability rules. Instead of basing the readability threshold on a subject measure of appearance, the readability threshold is based on specific measurements from the presentation document. Those specific measurements are utilized to determine the risks associated with transforming certain portions of the document in view of the readability rules.

The quantification of the appearance of the green presentation document is based on the appearance of the output. With respect to a presentation document, the key appearance attributes are text legibility and fidelity of geometry. Text legibility may be presented by utilizing a step function. In one embodiment, a process is utilized to determine geometry fidelity. The geometry fidelity process arranges shapes in a predetermined dimension format on a slide. As an example, the shapes may be arranged in two and one half dimensions on a slide, i.e., the arrangement of the shapes includes an (X,Y) coordinate and a z-order. Shapes may also have rectangular dimensions, e.g., width and height. A shape with rectangular dimensions may be represented as two one-dimensional ranges and a z-index as ((X, X+W), (Y,Y+H),z). Further, the relative position of one shape S2 with respect to another shape 51 may be represented as a 9D point P ($BB_x$, $EB_x$, $EA_x$, $BA_x$, $BB_y$, $EB_y$, $EA_y$, $BA_y$, Z) where each coordinate is defined as follows. Z denotes the difference in the z-orders normalized as z-index/Num Shapes. The Functions Begins Before (BB), Ends Before (EB), Begins After (BA), and Ends After (EA) may be defined for an interval pair ($I_1$, $I_2$) such that $I_1$=($x_1$, $x_2$), $I_2=(x_1',x_2')$, $x_1<=x_2$, and $x_1'<=x_2'$. $BB(I_1,I_2)$ equals $(x_1'-x_1)/N$ (>0 if the interval $I1$ begins before interval $I_2$ begins, <=0 otherwise). $EB(I_1,I_2)=(x_2'-x_2)/N$ (>0 if the interval $I_1$ ends before interval $I_2$ ends, <=0 otherwise). $BA(I_1,I_2)=(x_1'-x_2)/N$ (>0 if the interval $I_2$ begins only after interval $I_1$ ends, <=0 otherwise). $EA(I_1,I_2)=(x_2'-x_1)/N$ (>0 if the interval $I_2$ ends only after interval $I_1$ begins, <=0 otherwise). Each of these functions is defined for the X and Y coordinates of the shape rectangles. N is the width of the slide W and height of the slide H respectively. As an example, $EA_y=(y_2'-y_1)/H$). Further, the point P represents the information about how shapes are arranged in space with respect to each other.

A transformation on the slides changes positions of the shapes and the shapes' sizes. In effect, the transformation modifies the positions, sizes, and/or the shapes' z-order. As a result, the relative positions of the shapes to one another may be changed. The distance between two states for a pair of shapes is defined as the Euclidean distance between the representations of the relative position of the two shapes with respect to each other. The distance has some particular properties. For instance, if the positions of the shapes are inverted, then the distance is large. An example of shapes being inverted is one shape being previously to the left the other and now being the other way around. If the sizes of the shapes are changed so that if previously they were not overlapping, but now they do overlap, the distance is large. The pair-wise relative positions of all shapes with respect to each other are determined before and after transformation. For example, Pos[i,j] may be determined for all i≠j in the slide before the transformation is applied. Subsequently, the pair-wise distances between all shapes is determined. For example, Pos'[i,j] for all i≠j in the slide after the transformation is applied. After the pair-wise distances are determined, the sum of all the distances is determined. For example, M equals ||(Pos[i,j], Pos'[i,j])|| where ||D|| is the $L_2$-norm distance between the points.

The fidelity of geometry for a transformation is defined as $G=1/(1+(f^2*M)$ where $f_i$ is the apparent scaling ratio for the slide. This apparent scaling ratio is the ratio of the width of output shape by its input width for the transformation. The appearance score may then be determined as the aggregate score the text legibility Li and the fidelity of geometry. In other words, $P_i=G_i*L_i$. For text-free slides, the text legibility is assumed to be one, i.e., normal.

In one embodiment, transformations are filtered according to the kinds of slides that are present in the presentation document and reconciled to make sure that the same transformations are applied on all of the slides. Because determining the overall appearance score is expensive, the overall appearance score may be avoided for slides with a large number of shapes. Every transformation may have an average rated impact in terms of papers savings, i.e., a number $N_i$ for a transformation $T_i$. The transformations may be ranked by the combined rank ($N_i*P_i$).

In addition to determining an appearance score for a presentation document, latent document structure may be extracted from a presentation document for green printing. Presentation software programs typically provide a method to print a presentation in the form of an N-slide per page handout. For such a print output, the slides are scaled without any consideration of the content in those slides. For example, consideration is typically not given by a presentation software program as to whether the text in the slides will or will not be readable. In order to scale the content to create handouts which consider the readability aspects of the output, the semantic structure of the presentation and the slides is extracted and analyzed.

A heuristic driven algorithm extracts the latent structure present in the presentation and individual slides. A probabilistic rule based model is utilized to label slides and the content present on the slides. The context of labeling shapes for extracting structure ensures reliable printing. Re-layout based green printing extracts the structure to save paper and ink. Semantics labels are applied to help in green printing. For example, a group of shapes may not necessarily be a diagram, but is labeled as a diagram to place the objects together while layout out the output slides. A text box may not be the main text of the slide, e.g., just a note. However, as that text box is the only text box on the slide, this text box will be the only text appearing on that slide if that text box is labeled as the main text of a slide. The text box will be the only text appearing prominently on the slide. Further, the text will have an appearance consistent all the other main text blocks in the output. Accordingly, a green printing system may produce unique print outputs such as a smart handout as illustrated in FIG. 4B. The formatting of the shapes/text in the final output may be determined. In one embodiment, slide labels, shape labels, and/or logical shape groups may be identified in a presentation document. A slide label may be labeled as a title slide, content slide, separation slide, outline slide, agenda slide, or the like. Further, a shape label is a shape in a slide that may be labeled as a title, title image, logo, main text, large text (not main text), main diagram, label, footer, or the like. In addition, a logical shape group may be a diagram. These labels are utilized to control the formatting of the content in the output. For example, titles and main text on all outputs slides may have to have the same font size so that the overall appearance of the output is consistent. Probabilistic rules are utilized to identify slide labels, shape labels, and/or logical shape groups. The probabilistic rules are based on sequence of appearance (for slides), location on the slide, relative text sizes (for shapes including text—frames only), relative and absolute dimensions, relative color, relative and absolute text length (for shapes including text frames only).

Figure 5:
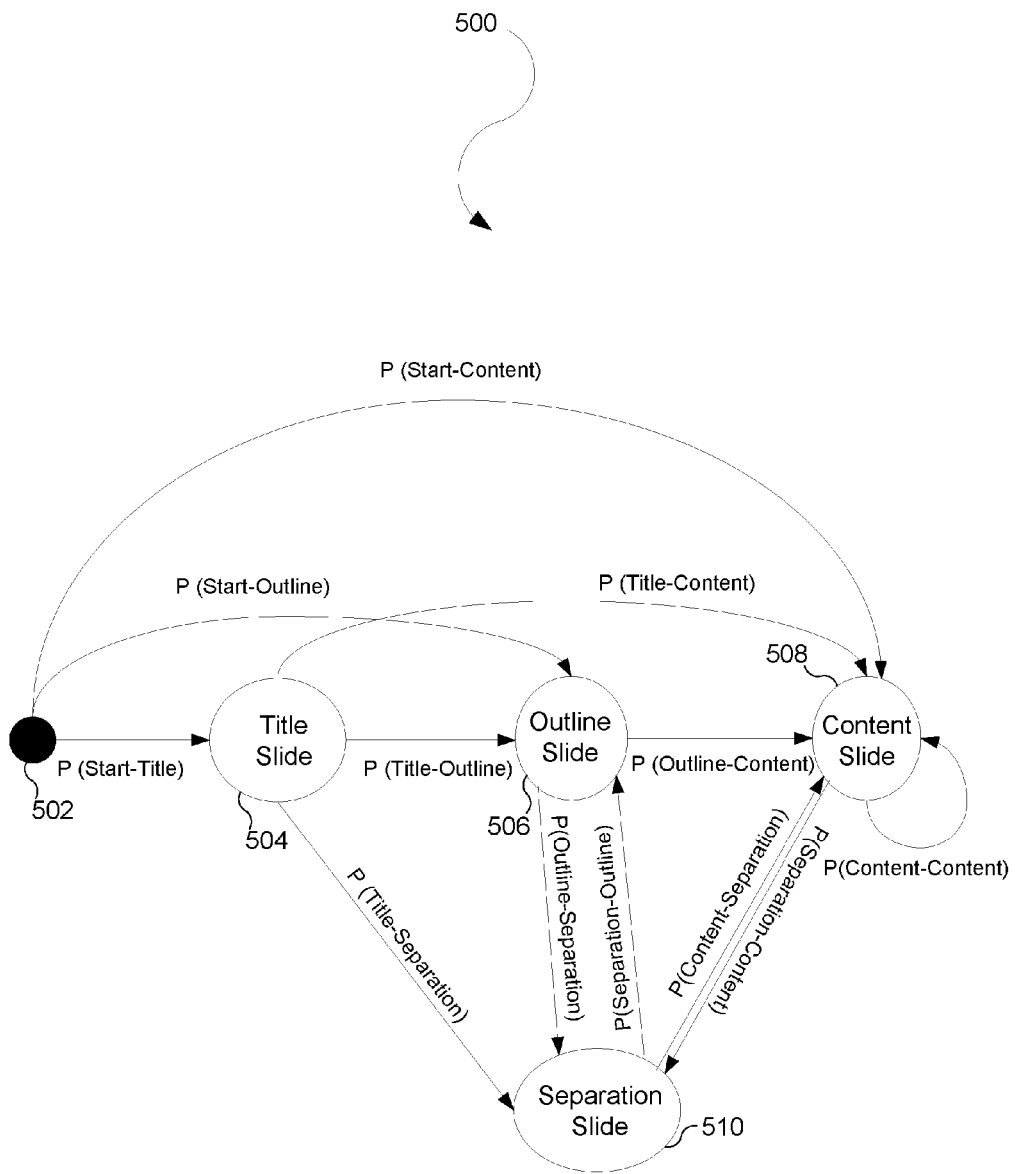
FIG. 5 illustrates a probabilistic state-transition model that identifies slide labels.

FIG. 5 illustrates a probabilistic state-transition model 500 that identifies slide labels. The probabilistic state-transition model 500 provides basic probabilities for the sequence of appearance of slide types in a presentation. States are transitioned over, and the label for the current slide is asserted at every step. The labels are affirmed utilizing another set of rules based on the shape labels for that slide. The probabilities provide an indication of which set of rules to try first to obtain a greater chance of quick success. In other words, the probabilities act as selectors for the other structures. The probabilistic state-transition model 500 has a start node 502, a title slide node 504, an outline slide node 506, a content slide 508, and a separation slide 510. A variety of probabilities are illustrated for a sequence from one node to another node, i.e., an edge. For example, the edge P(Start-Title) indicates the probability for the sequence of from the start node 502 to the title slide node 504. Other possible sequences are illustrated in FIG. 5.

Figure 6:
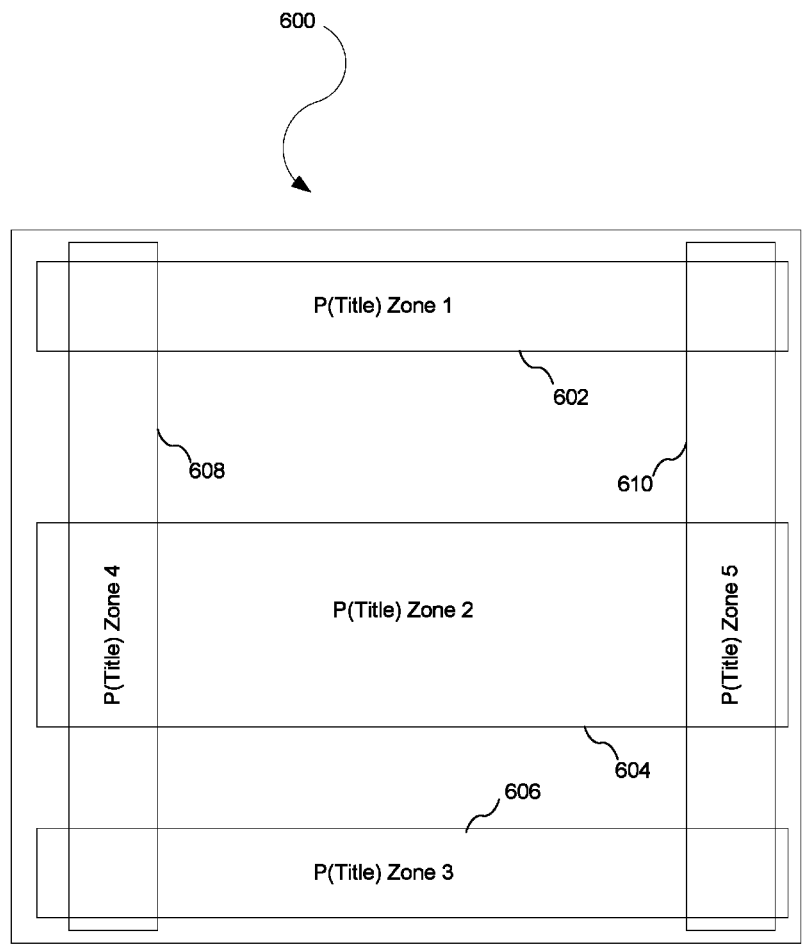
FIG. 6 illustrates an example of a zone map of the title entity for a presentation document.

Further, a zone map may be utilized. A zone map may be defined for each entity that has to be identified. The zone map provides the probability of that entity being present in different parts of the slide. FIG. 6 illustrates an example of a zone map 600 of the title entity for a presentation document. As an example P(Title) Zone One 602 indicates the probability of the title entity being present in the first zone, P(Title) Zone Two 604 indicates the probability of the title entity being present in the second zone, P(Title) Zone Three 604 indicates the probability of the title entity being present in the third zone, P(Title) Zone Four 608 indicates the probability of the title entity being present in the fourth zone, and P(Title) Zone Five 610 indicates the probability of the title entity being present in the fifth zone. These zones are derived from overlaying maps derived from a training data set, determining the cumulative probabilities for different zones in the slide, and restricting probabilities below a certain threshold. The zone map 600 provides a location probability for a particular entity. Shapes on a slide are evaluated by making range queries, which are bounded by the shapes' bounding rectangle, on the zone map 600 that is stored internally as a list of kd-trees, e.g., k equals two. In one embodiment, a zone map is generated for each slide label. The nodes of the tree store the rectangular zones for a given type of a slide. The query result is a set of probabilities for different shape labels. Probabilities of identical labels of multiple matching nodes are averaged and weighted by the area of overlap with each zone. In one embodiment, a pre-computed zone map may be utilized for each shape label in a plurality of shape labels to indicate a probability of each shape label in the plurality of shape labels being in particular location in a slide. Further, in one embodiment, a processor may utilize the pre-computed zone map.

In one embodiment, relative and absolute text size rules may be utilized Relative text sizes are sometimes a very good indicator of the kind of text boxes encountered by the program. The relative text sizes are determined by the following with an input of a list of shapes in the slide and an output of the relative text sizes indexed by the shape:

MinRT=infinite
For each shape Shape in the slide
   RT(Shape)=Shape.Font.Size
   If Shape.Font.Bold=true
     then RT(Shape)=RT(Shape)+0.25
   If Shape.Font.Italic=true
     then RT(Shape)=RT(Shape)+0.15
   If Shape.Font.Underlined=true
     then RT(Shape)=RT(Shape)+0.20
   If RT(Shape)<MinRT
     then MinRT=RT(Shape)
For each shape Shape in the slide
   RT(Shape)=RT(Shape)−MinRT For some shapes, multiple fonts are utilized in the text. Subsequently, the Shape.Font structure is determined by taking a weighted average of the different font sizes present in the shape's text. The absolute text size is the font size or average font size of the shape.

These text sizes (relative and absolute) are utilized as follows. Shapes from the training data have different relative and absolute text sizes. The distribution of absolute text sizes for each of the entities is pre-computed for each of the entities that have to be labeled. The distribution of ranks of each entry in the relative text sizing is also computed. For example, title text is invariably larger than the text present in other shapes. Accordingly, E(rt), i.e., the expected value of the relative text size of the entity, and E(at), the expected value of the absolute size of the entity, are two values that are defined for each entity label. The variance of the distribution is also determined to provide for tolerance intervals when matching against the query shapes.

The dimensions and text lengths are computed in a similar manner to that of text font size. However, the text font sizes are replaced with the width, height, and the number of characters of the shapes.

Relative color may also be utilized as text sizes, dimensions, etc. may not complete the visual picture. As an example, in some slides, the only differentiator between a title text and a label is the color of the text. The relative color approach also attempts to differentiate the objects on the slides based on the perceptual difference between the colors of different entities. For each entity label, the closeness of it text and fill colors is computed with those in other shapes (normalized by the number of shapes in the slide). The colors themselves are first quantized in the RGB planes and then compared. The lightness in the HSL plane is also compared to determine variations of the same color being utilized in different shapes as a differentiator of importance and an indicator of similarity.

The structures are utilized in functions that return a list or probabilities indexed by the different entity labels. For a given shape, the functions return this list that represents the probabilities that the shape should be assigned with the different labels. A simple (unweighted) sum of these probabilities is then determined, and the label is utilized with the maximum probability.

The grouping of shapes into logical groups happens after the shapes in the slides have been labeled. Grouping is done with the purpose of not destroying the relative geometries of related objects in transformation. Shapes are grouped on the basis of rules that measure overlap, proximity, formatting, and presence of connectors or connecting shapes such as arrows. With respect to the presence of connectors or connecting shapes such as arrows, presentations often have connectors or arrow shapes that point from one shape to another. Shape grouping involves testing proximity of every shape with arrow-heads and tails of such shapes in the slide. If such a proximity or overlap is detected, the shapes that are close to the arrow head and the tail are grouped together with the arrow shape.

Slide labeling is completed when all of the shapes have been grouped and labeled. The successful labeling of shapes and their groupings are utilized for affirming the slide label.

Figure 7:
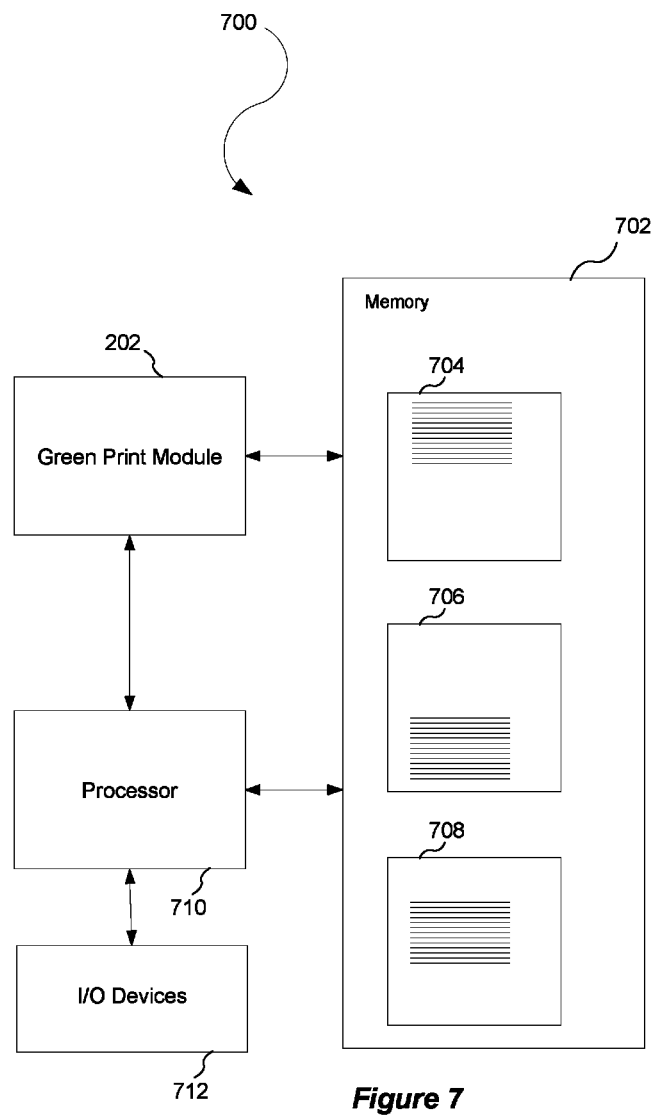
FIG. 7 illustrates a system configuration that may be utilized for green printing.

FIG. 7 illustrates a system configuration 700 that may be utilized for green printing. In one embodiment, the green print module 202 interacts with a memory 702. The green print module 202 generates a variety of potential repurposed documents that meet the readability threshold. For example, a first potential repurposed presentation document 704 may have content according to one format that meets the readability threshold, a second potential repurposed presentation document 706 may have content according to another format that meets the readability threshold, and a third potential repurposed presentation document 708 may have content according to yet another format that meets the readability threshold. Lines are provided in the various potential green presentation documents as illustrated in drawings such as FIG. 7 to represent text, symbols, shapes, images, and/or the like. The green print module 202 may select one final repurposed presentation document from these potential repurposed presentation documents by utilizing the repurposing quantifier. The repurposing quantifier may be the result of an equation that is based on the number of pages reduced and the degradation of the readability. Even if all of the potential repurposed presentation documents meet the readability threshold, a higher score will generally be given to a first repurposed presentation document that degrades readability less than a second repurposed presentation document with the same number of reduced pages. Further, even if all of the potential repurposed presentation documents meet the readability threshold, a higher score will generally be given to a first repurposed presentation document that reduces more pages than a second repurposed presentation document with the same readability degradation. In other words, the highest score will be given to the potential repurposed presentation document that as a whole minimizes readability degradation and maximizes page reduction better than the other potential repurposed presentation documents.

After the green print module 202 selects a potential repurposed presentation document, the green print module 202 provides the repurposed presentation document to a processor 710. Further, the processor 710 applies the transformations in the potential repurposed presentation document to the presentation document so that the user may print the final repurposed presentation document. The processor 710 interacts with input/output ("I/O") devices 712. For example, the processor 712 receives an input from a user through a keyboard to print the document. The processor 712 may then print the repurposed presentation document on a printer.

In one embodiment, the system configuration 700 is suitable for storing and/or executing program code and is implemented using a general purpose computer or any other hardware equivalents. The processor 710 is coupled, either directly or indirectly, to the memory 702 through a system bus. The memory 702 can include local memory employed during actual execution of the program code, bulk storage, and/or cache memories which provide temporary storage of at least some program code in order to reduce the number of times code must be retrieved from bulk storage during execution.

The I/O devices 712 can be coupled directly to the system 700 or through intervening input/output controllers. Further, the I/O devices 712 can include a keyboard, a keypad, a mouse, a microphone for capturing speech commands, a pointing device, and other user input devices that will be recognized by one of ordinary skill in the art. Further, the I/O devices 712 can include output devices such as a printer, display screen, or the like. Further, the I/O devices 712 can include a receiver, transmitter, speaker, display, image capture sensor, biometric sensor, etc. In addition, the I/O devices 712 can include storage devices such as a tape drive, floppy drive, hard disk drive, compact disk ("CD") drive, etc.

Network adapters may also be coupled to the system configuration 700 to enable the system configuration 700 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes and systems. Therefore, it is to be understood that, within the scope of the appended claims, the present processes and systems may be practiced other than as specifically described herein.

We claim:

1. A non-transitory computer useable medium having a computer readable program, wherein the computer readable program when executed on a computer causes the computer to:

receive an indication that a printout of a presentation document has been requested, the presentation document having content with a format so as to occupy a space that would result in a first quantity of pages being printed, the content having a plurality of slides and a plurality of shapes;

preprocess the presentation document to acquire data associated with the presentation document;

perform group shaping to group the plurality of shapes into one or more groups based on a plurality of grouping rules which define shapes that have to be transformed together, wherein the plurality of grouping rules are based on at least two of measuring overlap, proximity, formatting and presence of connectors between the plurality of shapes;

perform content transformation to generate transformed content, wherein performing the content transformation removes formatting from a plurality of elements in each slide that make up the content and merging content to reduce whitespace thereby causing the presentation document to occupy more space than the transformed content;

perform a content re-layout to determine placement of the merged elements of the content; and generate a green presentation document according to the content re-layout such that the green presentation document has a second quantity of pages that is less than the first quantity of pages.

2. The computer useable medium of claim 1, wherein the computer is further caused to perform shape labeling such that each of the plurality of shapes has a label, the label corresponding to an output characteristic.

3. The computer useable medium of claim 1, wherein the computer is further caused to perform slide labeling to generate a plurality of slide labels such that each slide in the presentation document is assigned a relative importance based on a slide label in the plurality of slide labels.

4. The computer useable medium of claim 3, wherein the computer is further caused to identify each of the plurality of slide labels according to a probabilistic state-transition model that provides probabilities for a sequence of appearance of slide types in the presentation document.

5. The computer useable medium of claim 3, wherein the computer is further caused to utilize a pre-computed zone map for each shape label in a plurality of shape labels to indicate a probability of each shape label in the plurality of shape labels being in particular location in a slide.

6. The computer useable medium of claim 1, wherein the computer is further caused to perform frame detection to identify a key-frame from a slide that includes one or more animations to be green printed.

7. The computer useable medium of claim 1, wherein the content transformation comprises one or more of changing orientation, shrinking text sizes, shrinking shape groups, shrinking images, flowing content from one slide into another by disregarding slide boundaries, removing shape fills and lightening colors.

8. A method comprising:
   receiving an indication that a printout of a presentation document has been requested, the presentation document having content with a format so as to occupy a space that would result in a first quantity of pages being printed, the content having a plurality of slides and a plurality of shapes;
   preprocessing the presentation document to acquire data associated with the presentation document;
   performing group shaping to group the plurality of shapes into one or more groups based on a plurality of grouping rules which define shapes that have to be transformed together, wherein the plurality of grouping rules are based on at least two of measuring overlap, proximity, formatting and presence of connectors between the plurality of shapes;
   performing content transformation to generate transformed content, wherein performing the content transformation removes formatting from a plurality of elements in each slide that make up the content and merging content to reduce whitespace thereby causing the presentation document to occupy more space than the transformed content;
   performing a content re-layout to determine placement of the merged elements of the content; and
   generating a green presentation document according to the content re-layout such that the green presentation document has a second quantity of pages that is less than the first quantity of pages.

9. The method of claim 8, further comprising performing slide labeling to generate a plurality of slide labels such that each slide in the presentation document is assigned a relative importance based on a slide label in the plurality of slide labels.

10. The method of claim 9, further comprising identifying each of the plurality of slide labels according to a probabilistic state-transition model that provides probabilities for a sequence of appearance of slide types in the presentation document.

11. The method of claim 9, further comprising utilizing a pre-computed zone map for each shape label in a plurality of shape labels to indicate a probability of each shape label in the plurality of shape labels being in particular location in a slide.

12. The method of claim 8, further comprising calculating a repurposing quantifier based on objective properties of the green presentation document to modify future content re-layouts.

13. The method of claim 12, wherein the objective properties comprise one of a difference between the first quantity of pages and the second quantity of pages and the appearance of the green presentation document as compared to the presentation document.

14. A system comprising:
   a green print module that receives an indication that a printout of a presentation document has been requested, the presentation document having content with a format so as to occupy a space that would result in a first quantity of pages being printed, the content having a plurality of slides and a plurality of shapes; and
   a processor that (i) preprocesses the presentation document to acquire data associated with the presentation document, (ii) performs group shaping to group the plurality of shapes into one or more groups based on a plurality of grouping rules which define shapes that have to be transformed together, wherein the plurality of grouping rules are based on at least two of measuring overlap, proximity, formatting and presence of connectors between the plurality of shapes, (iii) performs content transformation to generate transformed content, wherein performing the content transformation removes formatting from a plurality of elements in each slide that make up the content and merging content to reduce whitespace thereby causing the presentation document to occupy more space than the transformed content, (iv) performs a content re-layout to determine placement of the merged elements of the content, and (v) generates a green presentation document according to the content re-layout such that the green presentation document has a second quantity of pages that is less than the first quantity of pages.

15. The system of claim 14, wherein the content re-layout comprises one or more of scaling of the merged elements of the content, placement of the merged elements of the content, and fit-to-page approaches for the merged elements of content wherein.

16. The system of claim 14, wherein the processor also performs slide labeling to generate a plurality of slide labels such that each slide in the presentation document is assigned a relative importance based on a slide label in the plurality of slide labels.

17. The system of claim 16, wherein the processor also identifies each of the plurality of slide labels according to a probabilistic state-transition model that provides probabilities for a sequence of appearance of slide types in the presentation document.

18. The system of claim 16, wherein the processor also utilizes a pre-computed zone map for each shape label in a plurality of shape labels to indicate a probability of each shape label in the plurality of shape labels being in particular location in a slide.

* * * * *